United States Patent
Barsoum et al.

(10) Patent No.: US 6,816,465 B1
(45) Date of Patent: Nov. 9, 2004

(54) ARRANGEMENT FOR TESTING PAUSE FRAME RESPONSE IN A NETWORK SWITCH

(75) Inventors: Ehab F. Barsoum, Sunnyvale, CA (US); Harand Gaspar, Cupertino, CA (US); Rizwan M. Farooq, Santa Clara, CA (US); Melissa D. Cooper, Mountain View, CA (US); Chong Chang Lin, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 833 days.

(21) Appl. No.: 09/770,659

(22) Filed: Jan. 29, 2001

(51) Int. Cl.[7] .................................................. H04J 1/16
(52) U.S. Cl. ........................ 370/252; 370/236; 370/241
(58) Field of Search ................................ 370/229, 230, 370/230.1, 231, 232, 235, 236, 252, 253, 241, 244, 356, 445

(56) References Cited

U.S. PATENT DOCUMENTS

| | | | |
|---|---|---|---|
| 5,953,335 A | | 9/1999 | Erimli et al. |
| 5,995,488 A | * | 11/1999 | Kalkunte et al. ............ 370/232 |
| 6,167,029 A | * | 12/2000 | Ramakrishnan ............. 370/235 |
| 6,295,281 B1 | * | 9/2001 | Itkowsky et al. ............ 370/293 |
| 6,456,590 B1 | * | 9/2002 | Ren et al. .................... 370/229 |
| 6,633,585 B1 | * | 10/2003 | Ghanwani et al. .......... 370/468 |
| 6,704,280 B1 | * | 3/2004 | Mangin et al. .............. 370/230 |
| 6,754,179 B1 | * | 6/2004 | Lin ............................. 370/235 |

* cited by examiner

Primary Examiner—Chau Nguyen
Assistant Examiner—Christine Ng
(74) Attorney, Agent, or Firm—Manelli Denison & Selter PLLC; Leon R. Turkevich

(57) ABSTRACT

An arrangement for testing flow control logic in a network device such as a network switch includes a traffic generator configured for transmitting pause frames having prescribed pause values. The network device is configured for continuously transmitting data frames on a network medium. The traffic generator is configured for outputting a first pause frame to the network device that specifies a first pause interval on the order of ten minutes, followed by outputting during the first pause interval a second pause frame specifying a second pause interval substantially less than the first pause interval, for example on the order of ten seconds. The traffic generator is configured for measuring a time interval between transmission of the first pause frame and reception of subsequent data frames from the network device for evaluation of the flow control logic. Hence, the traffic generator can determine whether the second pause frame causes the flow control logic to cancel the first pause frame.

10 Claims, 1 Drawing Sheet

ARRANGEMENT FOR TESTING PAUSE FRAME RESPONSE IN A NETWORK SWITCH

BACKGROUND OF THE INVENTION

1. Field of the Invention

The present invention relates to testing of network devices such as integrated network switches configured for switching data packets between subnetworks.

2. Background Art

Local area networks use a network cable or other media to link stations on the network. Each local area network architecture uses a media access control (MAC) enabling network interface devices at each network node to access the network medium.

Switched local area networks such as Ethernet (IEEE 802.3) based systems are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes. Hence, network switch designers and test engineers need to be able to minimize the time and expense needed to evaluate designs during prototyping of Ethernet-based network systems.

One problem associated with testing network-based switch chips involves testing the various functions associated with the switch operation. In particular, the network switch disclosed in U.S. Pat. No. 5,953,335 discloses transmission of data packets in full-duplex mode according to the proposed Ethernet standard IEEE 802.3x Full-Duplex with Flow Control—Working Draft (0.3). The full-duplex environment provides a two-way, point-to-point communication link between each network station and the switch, where the switch and the respective stations can simultaneously transmit and receive data packets without collisions. Hence, two or more stations can simultaneously transmit and receive Ethernet data packets between each other via a switched hub without collisions.

Flow control has been proposed to reduce network congestion, where a sending station temporarily suspends transmission of data packets. A proposed flow control arrangement for a full duplex environment, referred to as IEEE 802.3x[2], specifies generation of a flow control message, for example a PAUSE frame. A transmitting station that receives the PAUSE frame enters a pause state in which no frames are sent on the network for a time interval specified in the PAUSE frame.

Unfortunately, there is no recognized procedure for testing the response of a transmitting station (e.g., a transmitting port on a network switch) to reception of a flow control frame.

SUMMARY OF THE INVENTION

There is a need for an arrangement that tests the response of an integrated network device, such as an integrated network switch, to the reception of flow control frames.

These and other needs are attained by the present invention, where an arrangement for testing flow control logic in an integrated network device such as a network switch includes a traffic generator configured for transmitting pause frames having prescribed pause values. The network device is configured for continuously transmitting data frames on a network medium. The traffic generator is configured for outputting a first pause frame to the network device that specifies a first pause interval, followed by outputting during the first pause interval a second pause frame specifying a second pause interval substantially less than the first pause interval. The traffic generator is configured for measuring a time interval between transmission of the first pause frame and reception of subsequent data frames from the network device for evaluation of the flow control logic. Hence, the traffic generator can determine whether the second pause frame causes the flow control logic to cancel the first pause frame.

One aspect of the present invention provides a method. The method includes configuring a network device having flow control logic for continuously transmitting data frames on a network medium. The method also includes outputting by a traffic generator a first pause frame onto the network medium, the first pause frame specifying a first pause interval. The method also includes second outputting by the traffic generator and within the first pause interval a second pause frame onto the network medium, the second pause frame specifying a second pause interval substantially less than the first pause interval. A time interval between transmission of the first pause frame and reception of subsequent data frames from the network device also is measured by the traffic generator for evaluation of the flow control logic.

Another aspect of the present invention provides a test system having a network device and a traffic generator. The network device has flow control logic configured for suspending transmission of data frames onto a network medium in response to detection of a pause frame specifying a pause interval, and the network device is configured for continuously transmitting data frames onto the network medium for testing of the flow control logic. The traffic generator is configured for outputting a first pause frame to the network device that specifies a first pause interval, followed by outputting during the first pause interval a second pause frame specifying a second pause interval substantially less than the first pause interval. The traffic generator also is configured for measuring a time interval between transmission of the first pause frame and reception of subsequent data frames from the network device for the testing of the flow control logic.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
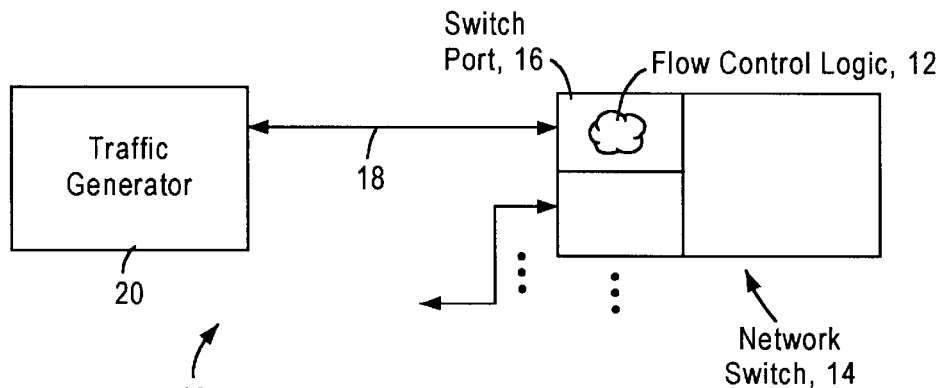
FIG. 1 is a block diagram of a system configured for testing flow control logic according to an embodiment of the present invention.

FIG. 1 is a block diagram illustrating a testing system 10 configured for testing flow control logic 12 within a network device 14, for example an integrated network switch as illustrated in U.S. Pat. No. 5,953,335. In particular, the flow control logic 12 may be implemented within an IEEE 802.3 compliant media access controller of an individual switch port 16 of the integrated network switch. The flow control logic 12 is configured for causing the switch port 16 to pause transmission of data frames onto a network medium for a pause interval specified by a received pause frame.

Testing of the flow control logic 12 is needed to ensure that the flow control logic 12 properly decodes a received pause frame to wait for the specified pause interval. In addition, the flow control logic 12 should be configured to ensure that a second flow control frame with a smaller pause interval can cancel the previously-received pause frame.

According to the disclosed embodiment, a traffic generator 20 is configured for outputting pause frames to the integrated network switch 14 and for testing the flow control logic 12 by measuring the time interval between transmission of pause frames and reception of subsequent data frames from the network switch port 16. Hence, the traffic generator 20 can determine whether the flow control logic 12 is responsive to pause frames sent by the traffic generator on the network medium 18. In addition, the traffic generator can determine whether the flow control logic 12 responds to multiple flow control frames, where the flow control logic 12 cancels an existing pause interval based on a second pause frame received during the pause interval.

Figure 2:
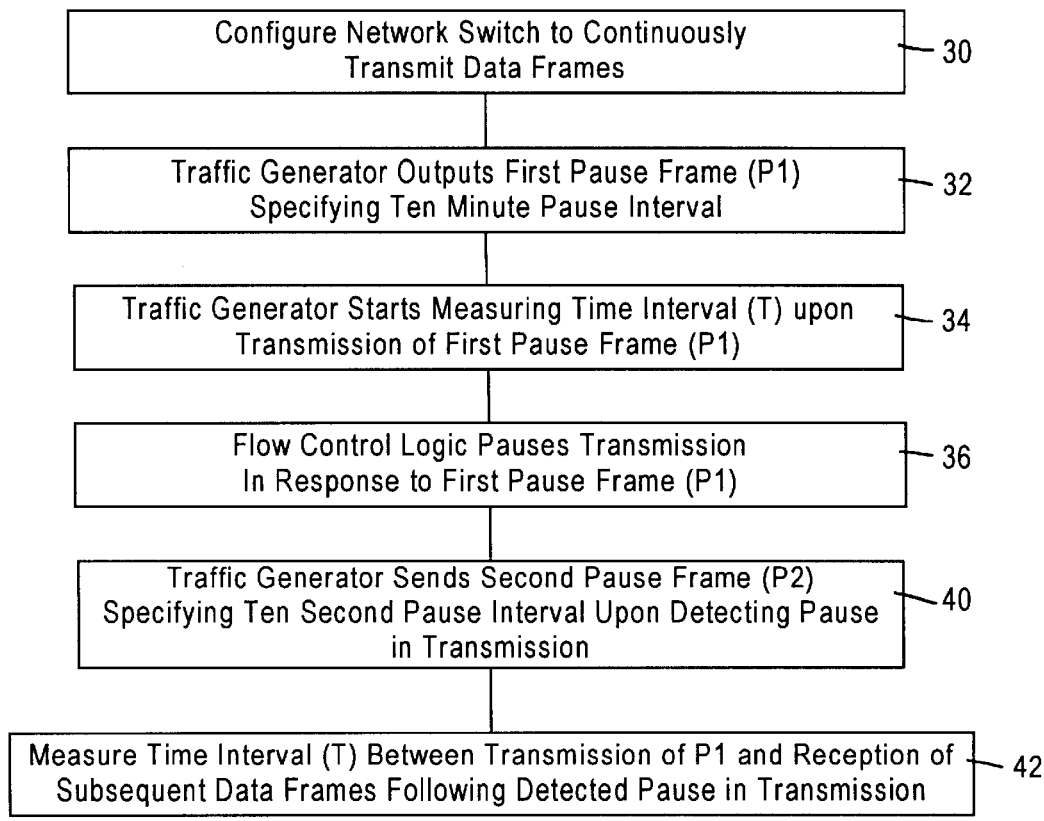
FIG. 2 is a diagram illustrating a method for testing the flow control logic according to an embodiment of the present invention.

FIG. 2 is a flow diagram illustrating the method of testing the flow control logic 12 according to an embodiment of the present invention. The method begins in step 30, where the network switch port 16 is configured for continuously transmitting data frames onto the network medium 18 according to IEEE 802.3 full duplex protocol. For example, the switch 14 may be configured in a test mode for continuous transmission of a prescribed data packet.

The traffic generator 20, in response to reception of the data frames from the network switch port 16, outputs in step 32 a first pause frame (P1) that specifies a first pause interval having an order of about ten minutes. The traffic generator 20 also begins measuring in step 34 a time interval starting with the transmission of the first pause frame (P1), and whether data packets are still being received from the network switch port 16. The flow control logic 12, in response to reception of the first pause frame (P1), causes the network switch port 16 to pause transmission of the data frames in step 36 for the first pause interval (e.g., 10 minutes). Hence, the traffic generator 20 should detect that the network switch port 16 pauses transmission of the data packets, following transmission of the first pause frame (P1), after a relatively small propagation delay between the traffic generator 20 and the network switch 14.

Upon detecting the pause in transmission of the data packets by the network switch port 16, the traffic generator 20 sends a second pause frame (P2) to the network switch port 16 in step 40 that specifies a second pause interval substantially less than the first ten minute pause interval. For example, the second pause interval may have a value of about ten seconds. The traffic generator 20 then evaluates the flow control logic 12 by determining whether the flow control logic 12 cancels the existing ten minute pause interval and resets the pause interval to the second pause interval of ten seconds. In particular, the traffic generator 20 measures in step 42 the time interval between transmission of the first pause frame (P1) and reception of subsequent data frames from the network switch port 16.

Hence, the traffic generator 20 can easily determine whether the flow control logic 12 is operating properly: if the second pause frame (P2) is output a few seconds after the first pause frame (P1), then a total pause interval of 12 to 13 seconds indicates that the flow control logic 12 is operating properly. However if the traffic generator 20 determines that the network switch port 16 continues to pause transmission ten seconds after transmission of the second pause frame (P2), then an engineer can quickly determine that the flow control logic 12 did not cancel the first pause interval in response to reception of the second pause frame.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method comprising:
   configuring a network device having flow control logic for continuously transmitting data frames on a network medium;
   first outputting by a traffic generator a first pause frame onto the network medium, the first pause frame specifying a first pause interval;
   second outputting by the traffic generator and within the first pause interval a second pause frame onto the network medium, the second pause frame specifying a second pause interval substantially less than the first pause interval; and
   measuring by the traffic generator a time interval between transmission of the first pause frame and reception of subsequent data frames from the network device for evaluation of the flow control logic.

2. The method of claim 1, wherein the first outputting step includes setting the first pause interval to an order of about ten minutes.

3. The method of claim 1, wherein the second outputting step includes setting the second pause interval to an order of about ten seconds.

4. The method of claim 1, wherein the measuring step includes determining whether the second pause frame causes the flow control logic to cancel the first pause interval.

5. The method of claim 1, wherein the first and second outputting steps each include outputting the corresponding pause frame according to IEEE 802.3 protocol.

6. A test system comprising:
   a network device having flow control logic configured for suspending transmission of data frames onto a network medium in response to detection of a pause frame specifying a pause interval, the network device configured for continuously transmitting data frames onto the network medium for testing of the flow control logic; and
   a traffic generator configured for outputting a first pause frame to the network device that specifies a first pause interval, followed by outputting during the first pause interval a second pause frame specifying a second pause interval substantially less than the first pause interval, the traffic generator configured for measuring a time interval between transmission of the first pause frame and reception of subsequent data frames from the network device for the testing of the flow control logic.

7. The system of claim 6, wherein the traffic generator is configured for setting the first pause interval to an order of about ten minutes.

8. The system of claim 6, wherein the traffic generator is configured for setting the second pause interval to an order of about ten seconds.

9. The system of claim 6, wherein the traffic generator is configured for determining whether the second pause frame cancels the flow control logic to cancel the first pause interval.

10. The system of claim 6, wherein the network device and the traffic generator output the data frames and the pause frames according to IEEE 802.3 protocol, respectively.

* * * * *